US007120535B2

(12) United States Patent
Rahman et al.

(10) Patent No.: US 7,120,535 B2
(45) Date of Patent: Oct. 10, 2006

(54) METHOD AND APPARATUS TO EVALUATE AN INTAKE AIR TEMPERATURE MONITORING CIRCUIT

(75) Inventors: Mahfuzur Rahman, Belleville, MI (US); Kenneth M. Simpson, Swartz Creek, MI (US); Paulo F. R. Tranquilli, Campinas (BR)

(73) Assignee: Delphi Technologies, Inc., Troy, MI (US)

( * ) Notice: Subject to any disclaimer, the term of this patent is extended or adjusted under 35 U.S.C. 154(b) by 80 days.

(21) Appl. No.: 11/036,214

(22) Filed: Jan. 14, 2005

(65) Prior Publication Data

US 2006/0157001 A1 Jul. 20, 2006

(51) Int. Cl.
*G06F 19/00* (2006.01)

(52) U.S. Cl. ...................................... 701/114; 73/118.2

(58) Field of Classification Search ................ 701/114, 701/103, 110, 115, 102; 73/118.2, 117.3; 123/361, 399
See application file for complete search history.

(56) References Cited

U.S. PATENT DOCUMENTS 5,153,835 A 10/1992 Hashimoto et al.
5,880,361 A 3/1999 Taniguchi
6,091,324 A 7/2000 Arsenault et al.
6,208,917 B1 3/2001 McKissick, Jr. et al.
6,209,821 B1 * 4/2001 Gary ........................ 244/53 B
6,561,016 B1 * 5/2003 Suhre et al. ............... 73/118.2

OTHER PUBLICATIONS

Service Manual Document # 546739: DTC P0113 Intake Air Temperature (IAT) Sensor Circuit High Voltage.
Service Manual Document # 546738: DTC P0113 Intake Air Temperature (IAT) Sensor Circuit Low Voltage.
Service Manual Document # 546865: DTC P1111 Intake Air Temperature (IAT) Sensor Circuit Intermittent High Voltage.

* cited by examiner

*Primary Examiner*—Hieu T. Vo
(74) *Attorney, Agent, or Firm*—Paul L. Marshall

(57) ABSTRACT

A control system and method to monitor an intake air temperature sensing circuit for an internal combustion engine is shown. The electronic controller is connected to the intake air temperature sensing circuit, coolant temperature sensor, and a plurality of other engine sensors. The controller determines whether the measured intake air temperature changes in response to a change in actual intake air temperature, based upon the engine operating conditions and the measured intake air temperature. The controller determines whether the measured intake air temperature is representative of actual intake air temperature, based upon the measured intake air temperature, the coolant temperature, and at least one engine operating condition. The invention is an element of an on-board diagnostic system, typically related to vehicle emissions.

8 Claims, 5 Drawing Sheets

METHOD AND APPARATUS TO EVALUATE AN INTAKE AIR TEMPERATURE MONITORING CIRCUIT

TECHNICAL FIELD

This invention pertains generally to internal combustion engine control systems, and more specifically to a method and apparatus related to the engine control system wherein performance of an intake air temperature sensing circuit is monitored and abnormalities are detected.

BACKGROUND OF THE INVENTION

A typical engine control system for a modern spark ignition internal combustion engine includes an electronic controller operable to measure engine operating conditions and operator inputs, and operable to control various systems and actuators based upon the measured conditions and inputs. The typical electronic controller includes an interface electrically connected to a plurality of engine and vehicle sensors via one or more wiring harnesses. The engine and vehicle sensors measure various engine operating conditions and operator demands. Measured conditions include intake air temperature, as well as other engine conditions, including for example, engine rotational speed and position, engine load, vehicle speed, engine coolant temperature, engine air/fuel ratio, accessory demands, and the operator's demand for power. The engine control system is operably connected to engine and powertrain actuators and systems that act to control the engine, in response to the engine operating conditions and operator demands. Typical actuators and systems include, for example, fuel injectors, fuel pump, idle air control valve, exhaust gas recirculation valve, throttle control valve, transmission solenoids, and an exhaust system.

A skilled practitioner designs and implements software algorithms and calibrations which are executed in the electronic controller to measure the engine operating conditions and operator demands, and control the engine actuators accordingly. In addition to software algorithms and calibrations for controlling engine actuators in response to operating conditions and operator demands, the controller also includes algorithms and calibrations that perform on-board monitoring and diagnosis of various components and systems. The software algorithms and calibrations are typically developed and inserted into software of the engine controller during engine development, prior to start of production.

The intent of the on-board monitoring and diagnosis system is to ensure that an operator is notified when performance of a component or system has degraded to a level that emissions performance has been substantially affected. The operator is notified via a malfunction indicator lamp of the system degradation, and a skilled mechanic may use a diagnostic scan tool to recover information from the controller that assists in diagnosing a malfunction and subsequently repairing the system.

Each of the engine control and diagnostic algorithms relies upon accurate reading of various engine operating conditions and operator inputs in order to properly control the various systems and actuators. An inaccurate reading of one or more of the operating conditions has the potential to adversely affect engine performance, driveability, or emissions, or cause a false failure of one or more engine or vehicle diagnostics.

A skilled practitioner uses intake air temperature information read from the intake air temperature sensing circuit as input to a substantial number of engine control and diagnostic algorithms. An intake air temperature reading may affect whether another algorithm is executed, e.g. if entrance criteria for executing the algorithm includes the intake air temperature reading must be within a specified range. Intake air temperature reading may affect execution of another algorithm, e.g. wherein the intake air temperature reading affects calculated mass of air flowing to the engine, thus affecting engine fueling. An improperly operating engine caused by an inaccurate intake air temperature reading may lead to increased engine-out and tailpipe emissions. Therefore, accurate reading of intake air temperature is required for proper engine operation on an engine equipped with an electronic control system.

Past diagnostic systems have required that the intake air temperature sensor be monitored to determine when the sensor or circuit fails. Standardized diagnostic trouble codes ('DTC') have been established as a result of federal and state On-Board Diagnostic regulations. They include DTCs for monitoring and reporting intake air temperature sensor malfunctions, as follows: DTC P0112: Intake Air Temperature (IAT) Sensor Circuit Low Voltage, and DTC P0113: Intake Air Temperature (IAT) Sensor Circuit High Voltage. As indicated, these DTCs are set when an on-board diagnostic algorithm detects that the Intake Air Temperature (IAT) Sensor Circuit is out of range because the monitored output voltage for the sensor is excessively low or excessively high. Passenger cars and trucks sold in the United States since model year 1996 have been required to have such diagnostic algorithms on-board.

The algorithms associated with detection of DTCs P0112 and P0113 are most effective in detecting failures caused by an open electrical circuit or a shorted electrical circuit. However, these diagnostic algorithms do not account for all intake air temperature sensing circuit failure modes encountered during vehicle operation. A typical intake air temperature monitoring circuit includes a sensing device, a wiring harness including one or more electrical connectors, a voltage supply, one or more electrical filtering circuits, and an analog-to-digital converter that provides interface to the controller. The sensing device is typically a resistive temperature device, wherein electrical resistance of the device changes in response to a change in temperature. The engine controller typically employs a voltage divider circuit to measure a voltage drop across the resistive temperature device, and is able to translate the measured voltage drop into a temperature reading using a predetermined calibration. A change or intrusion into the intake air temperature sensing circuit that affects the voltage drop measured by the controller may affect the intake air temperature reading. Such changes or intrusions may include, for example, corrosion at a connector leading to increased electrical resistance in the circuit, among others known to one familiar with electrical circuit design. Therefore, what is needed is a method and apparatus which monitors the intake air temperature sensing circuit and detects changes in measurements by the controller that lead to erroneous IAT readings.

SUMMARY OF THE INVENTION

The present invention provides an improvement over conventional engine controls by supplying a control system and method to monitor an intake air temperature sensing circuit for the internal combustion engine. This includes the electronic controller signally connected to the intake air temperature sensing circuit, a coolant temperature sensing circuit, and a plurality of engine sensors. The electronic controller is operable to determine the measured intake air temperature changes in response to a change in actual intake air temperature, based upon the engine operating conditions and the measured intake air temperature. The electronic controller is also operable to determine the measured intake air temperature is representative of actual intake air temperature, based upon the measured intake air temperature, the coolant temperature, and the at least one engine operating condition.

Another aspect of the invention comprises the method and controller operable to determine that measured intake air temperature is accurate when the controller determines the change in the measured intake air temperature is a response to the change in actual intake air temperature, based upon the engine operating conditions and the measured intake air temperature.

Another aspect of the invention comprises the method and controller operable to determine that measured intake air temperature is accurate when the controller determines the measured intake air temperature is representative of actual intake air temperature based upon the measured intake air temperature, the coolant temperature, and the engine operating conditions.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT OF THE INVENTION

Figure 1:
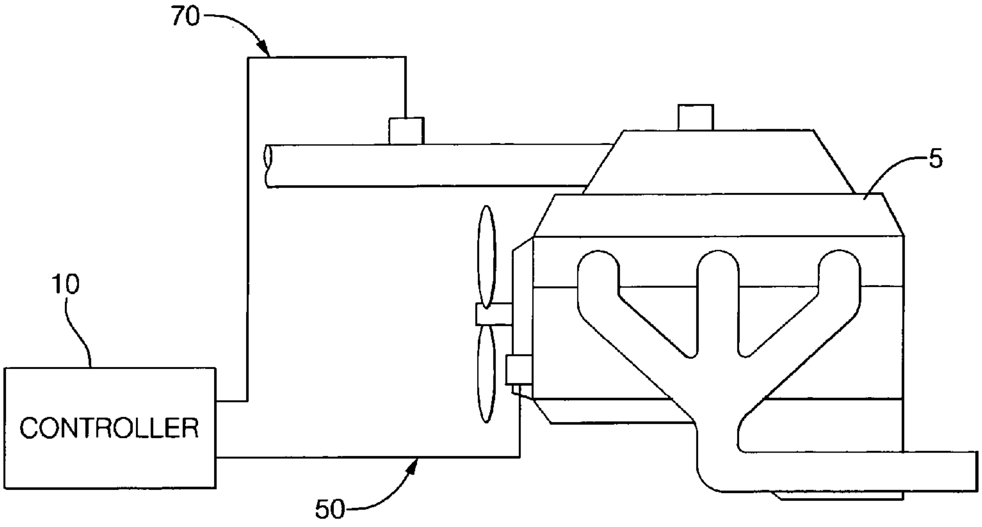
FIG. 1 is a schematic diagram of an exemplary engine control system, in accordance with the present invention.
Figure 2:
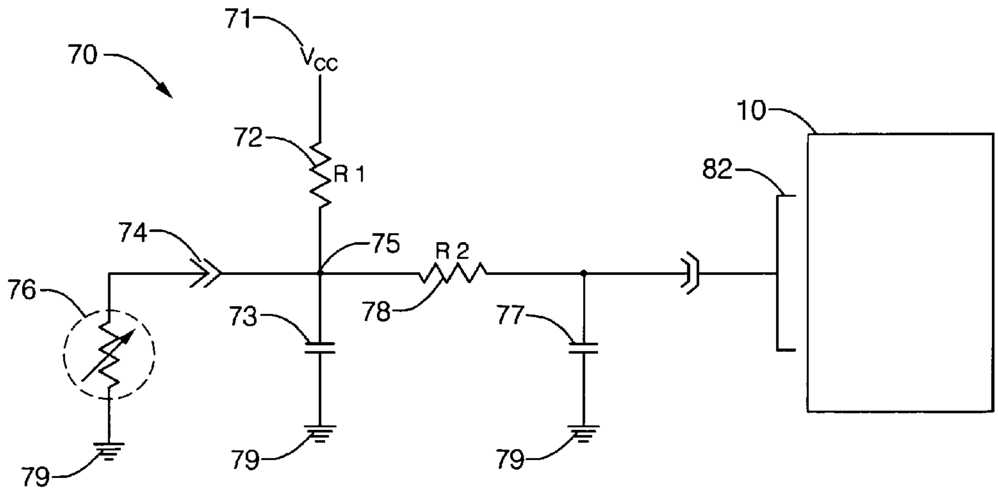
FIG. 2 is a schematic diagram of an element of the exemplary engine control system, in accordance with the present invention.
Figure 3:
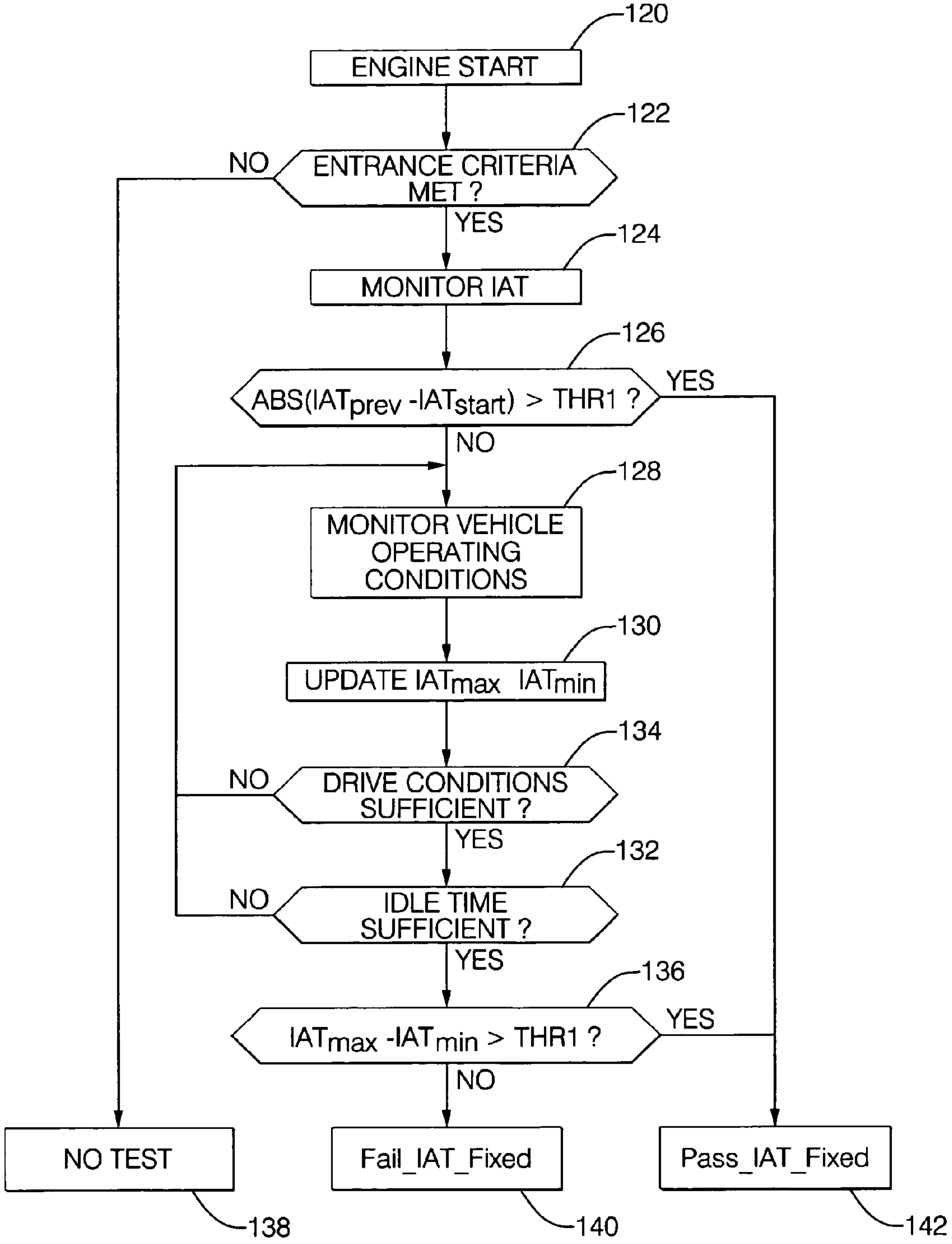
FIG. 3 is a process flow diagram, in accordance with the present invention.

Referring now to the drawings, wherein the showings are for the purpose of illustrating the invention only and not for the purpose of limiting the same, FIG. 1 shows an internal combustion engine 5 and control system which has been constructed in accordance with an embodiment of the present invention. In the embodiment, the internal combustion engine and control system includes an electronic controller 10 operable to monitor an intake air temperature (also referred to hereinafter as 'IAT') sensing circuit 70 (See FIG. 2) for the internal combustion engine. The electronic controller 10 is signally connected to the intake air temperature sensing circuit 70, a coolant temperature sensing circuit including a coolant temperature sensor 50, and a plurality of other engine sensors (not shown). This allows the electronic controller 10 to measure intake air temperature, $T_{AIR}$, coolant temperature, $T_{CLT}$, and engine operating conditions. Using on-board algorithms and calibrations, the controller determines whether the measured intake air temperature changes in response to a change in actual intake air temperature, based upon the engine operating conditions and the measured intake air temperature, also referred to as a fixed or stuck sensing circuit. The controller determines whether the measured intake air temperature is representative of actual intake air temperature, based upon the measured intake air temperature, the coolant temperature, and the engine operating conditions, also referred to as a skewed sensing circuit. This will be detailed hereinafter.

The exemplary internal combustion engine 5 is a spark-ignition engine comprising base engine components, sensing devices, output systems and devices, and a control system. The exemplary control system comprises the electronic controller 10 programmed with software algorithms and calibrations. The controller includes at least one microprocessor, a timing clock, associated memory devices, input devices for measuring input from external analog and digital devices, and output drivers for controlling various output devices. The controller 10 is operable to periodically measure engine operating conditions and operator inputs using the various sensors. The controller 10 regularly and ongoingly controls various engine operations with the output systems and actuators, using the pre-established algorithms and calibrations that integrate information from measured conditions and inputs. A skilled practitioner designs and implements software algorithms and calibrations which are executed in the electronic controller to measure the engine operating conditions and operator demands and control the engine actuators accordingly. The software algorithms and calibrations are preferably inserted into software of the engine controller during engine development, prior to start of production. Mechanization of the internal combustion engine, using sensors, output devices, and the controller 10 including development of algorithms and calibrations, is well known to one skilled the art.

The sensing devices of the exemplary internal combustion engine 5 are operable to measure ambient conditions, various engine conditions and performance parameters, and operator inputs. Each sensing device is signally connected to the controller 10 via an electrical wiring harness that comprises connectors, junctions, and other devices intended to protect integrity of the sensor signal.

In addition to the intake air temperature sensor 76 and coolant temperature sensor 50, other typical sensors of the exemplary system include a crank sensor, a manifold absolute pressure sensor, a throttle position sensor, a mass air flow sensor for measuring engine airflow, a vehicle speed sensor, an exhaust gas recirculation (EGR) position sensor, and one or more oxygen sensors or other exhaust gas sensors.

Referring again to FIG. 2, the intake air temperature sensing circuit 70 is shown. The intake air temperature sensor 76 of this embodiment is operable to measure temperature of air, $T_{AIR}$, incoming to the engine 5. The exemplary sensor 76 comprises a thermistor-type device operable to provide an output in units of resistance (Ohms) inversely proportional to temperature. Thermistor-type sensors are known to one skilled in the art. The sensor 76 is signally and electrically connected to the engine controller 10 via a wiring harness circuit, an example of which is described hereinafter. The primary circuit for the intake air temperature sensor 76 comprises a voltage divider, wherein the sensor 76 is connected in series with a first resistor 72 via connector 74 between a fixed power supply Vcc 71 and an electrical ground 79. A capacitor 73 is placed in parallel with the sensor 76 for electrical noise abatement. Node 75 is a point in the wiring harness circuit between the sensor 76 and the first resistor 72. Node 75 is signally electrically connected to an analog/digital converter 82 which signally electrically connected to the controller. The wiring harness circuit of this embodiment comprises electrical wiring with an electrical low pass RC filter, comprising a second resistor 78 and a second capacitor 77, which serve to reduce or eliminate high frequency electrical noise. The analog/digital converter 82 functions to convert the electrical analog signal measured at node 75 to a digital signal which is usable by the engine controller 10. Design of the wiring harness circuit for use with the intake air temperature sensing circuit 70, including sizing of resistors 72, 78 and capacitors 73, 77 is straightforward and known to one skilled in the art. The intake air temperature sensor 76 is typically an element of an air intake system, and is often included as an element of a mass airflow sensor (not shown). The intake air temperature sensor 76 in this embodiment is preferably mounted in an air duct between an air filter device and an air control valve (not shown). Application and use of various intake air temperature sensors, including thermistor-type devices, for use on internal combustion engines are known to one skilled in the art.

In this embodiment, temperature of engine coolant, $T_{CLT}$, is determined using the coolant temperature sensor 50 (also referred to as 'CTS'). The coolant temperature sensor 50 is preferably mounted in a manner wherein the sensing element is thermally proximal to engine coolant on the engine side of an engine thermostat. The coolant temperature sensor 50 of this embodiment is preferably a thermistor-type device signally electrically connected to the engine controller, and provides an output in units of resistance (Ohms) which is inversely proportional to coolant temperature. Application and use of various coolant temperature sensors, including thermistor-type devices, for use on internal combustion engines are known to one skilled in the art.

Referring now to FIG. 3 through FIG. 6, flowcharts representing algorithms implemented in the controller 10 and operable to monitor the intake air temperature sensing circuit 70, using input from the intake air temperature sensing circuit 70, the coolant temperature sensor 50, and engine operation, are shown. The controller monitors the intake air temperature sensing circuit 70 by executing a first test comprising an IAT_Fixed_Signal algorithm, and executing a second test comprising an IAT_Skewed_Signal algorithm. The controller determines that sensed intake air temperature is proper only when both the IAT skewed signal test and the IAT fixed signal test are passed. Each algorithm is preferably executed only once per trip event.

Referring again to FIG. 3, a flowchart representing the IAT fixed signal test, comprising the IAT_Fixed_Signal algorithm, is shown. The IAT_Fixed_Signal algorithm comprises measuring input from the intake air temperature sensing circuit 70 during engine startup and operation, and determining whether the IAT signal has changed under ambient conditions and engine operating conditions when a deviation in the IAT signal is anticipated. In operation, immediately upon engine start (block 120) it is determined whether entrance criteria for executing the algorithm are met (block 122). The entrance criteria focus on determining whether a cold engine start condition has been achieved, and comprise a measure of elapsed time since previous engine operation. This is referred to as soak time, and is a calibratable value. In this embodiment, the calibration value for the soak time is set to 480 minutes, or 8 hours. When the entrance criteria for executing the algorithm are not met (block 122), a No_Test condition is determined (Block 138), and the IAT_Fixed_Signal algorithm is discontinued for the trip. When the entrance criteria for executing the algorithm are met (block 122), the IAT_Fixed_Signal algorithm continues, and intake air temperature, as indicated by the intake air temperature sensing circuit 70, is measured by the controller (Block 124). In this embodiment, the intake air temperature is periodically measured by the controller 10 while the engine is operating, from engine start for a calibratable length of time. Preferably, the controller captures a measurement for intake air temperature every 3.25 milliseconds of engine operation. The intake air temperature measured at a previous engine shutdown event, $IAT_{PREV}$, which has been stored in non-volatile memory of the controller, is compared to intake air temperature measured at engine start, $IAT_{START}$, and a difference is calculated. When the calculated difference is greater than a first threshold, THR1, (Block 126) it is determined that the intake air temperature circuit is functioning properly with respect to the IAT_Fixed_Signal algorithm, and a PASS_IAT_Fixed result is communicated to the engine controller (Block 142). In this case, no further diagnostic algorithms are executed this trip event for the IAT_Fixed_Signal algorithm.

When the calculated difference is not greater than the first threshold, THR1, (Block 126), the controller continues with the idle/drive portion of the algorithm. A typical value for THR1 is about 3° C. (5° F.). Subsequently then, vehicle conditions are measured by the controller (Block 128), along with ongoing periodic measurement of intake air temperature. A maximum value for intake air temperature, $IAT_{MAX}$ and a minimum value for intake air temperature, $IAT_{MIN}$, are determined for the trip, by evaluating and updating values for $IAT_{MAX}$ and $IAT_{MIN}$ during the ongoing periodic measurement of intake air temperature. The algorithm measures vehicle and engine operating conditions (block 128) to determine that the engine has operated at sufficient amount of time under load, i.e. drive conditions (Block 134), and subsequently for a sufficient period of time at idle (Block 132) following the time under load. A sufficient amount of time at idle is preferably calibrated at 30 seconds, and a sufficient amount of time under load is preferably calibrated at 60 seconds, wherein the under load conditions are defined to be at or above an airflow of 15 grams per second and 40 kilometers per hour (25 miles per hour) in this embodiment. When it is determined that the drive conditions are sufficient (block 134) and the idle conditions are sufficient (block 132), the maximum intake air temperature, $IAT_{MAX}$ and the minimum intake air temperature, $IAT_{MIN}$ are compared (Block 136). When the compared difference exceeds the first threshold, THR1, then it is determined that the intake air temperature circuit 70 is functioning properly with respect to the fixed test, and a PASS_IAT_Fixed is communicated to the engine controller (Block 142). When the compared difference does not exceed the first threshold, THR1, then it is determined that the intake air temperature circuit 70 is not functioning properly with respect to the IAT_Fixed_Signal algorithm, and a FAIL_IAT_Fixed message is communicated to the engine controller (Block 140). When the FAIL_IAT_Fixed message is communicated to the engine controller, the controller acts to set a flag for DTC P0110. When the FAIL_IAT_Fixed occurs in two consecutive trips, a malfunction indicator lamp is set on the vehicle, and diagnostic trouble code DTC P0110 is the indicated failure when a skilled technician interrogates the engine controller. The process of storing diagnostic trouble codes and subsequent interrogation and retrieval is known to one skilled in the art.

Figure 4:
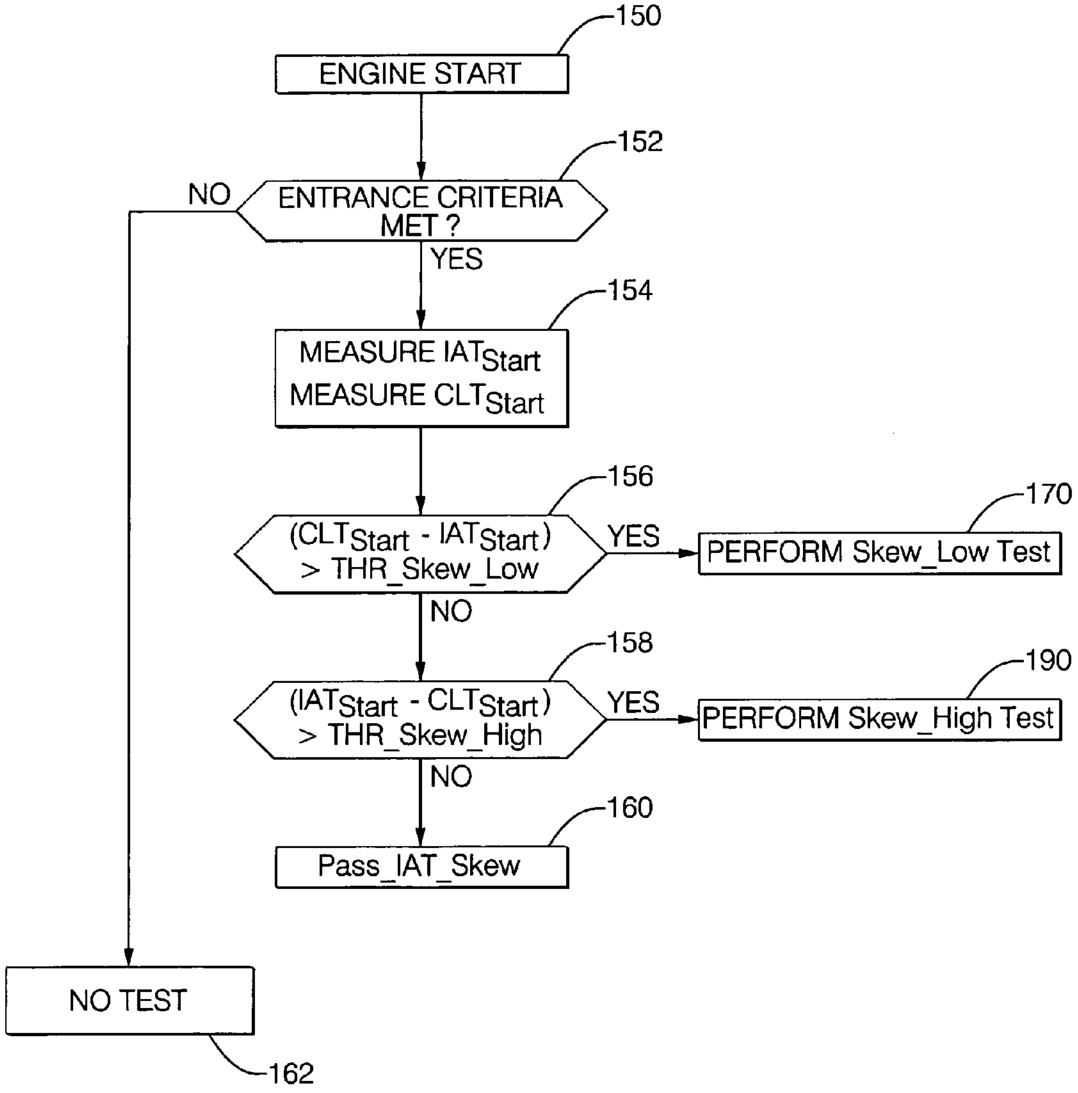
FIG. 4 is a process flow diagram, in accordance with the present invention.
Figure 5:
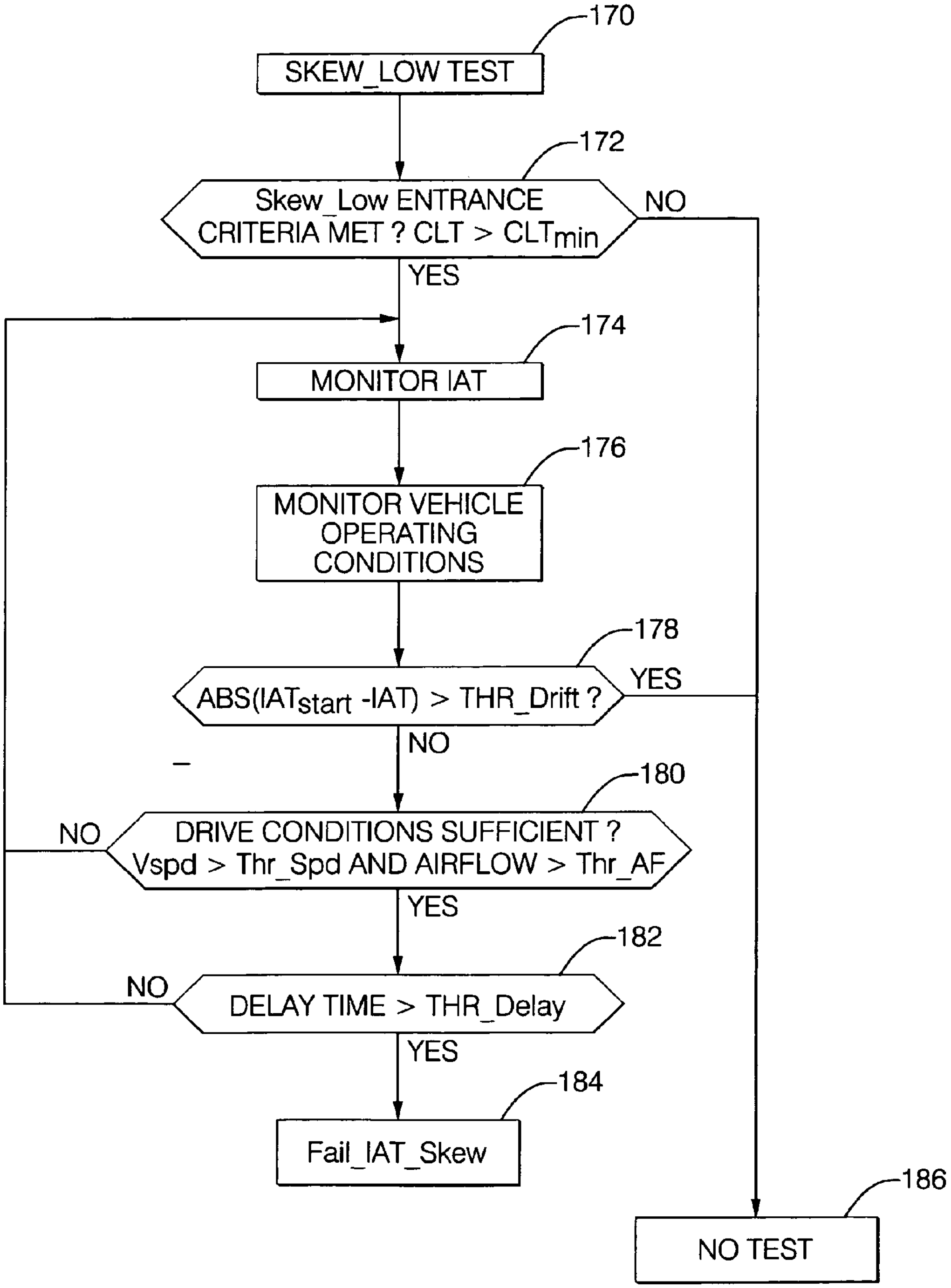
FIG. 5 is a process flow diagram, in accordance with the present invention; and, FIG. 6 is a process flow diagram in accordance with the present invention.
Figure 6:
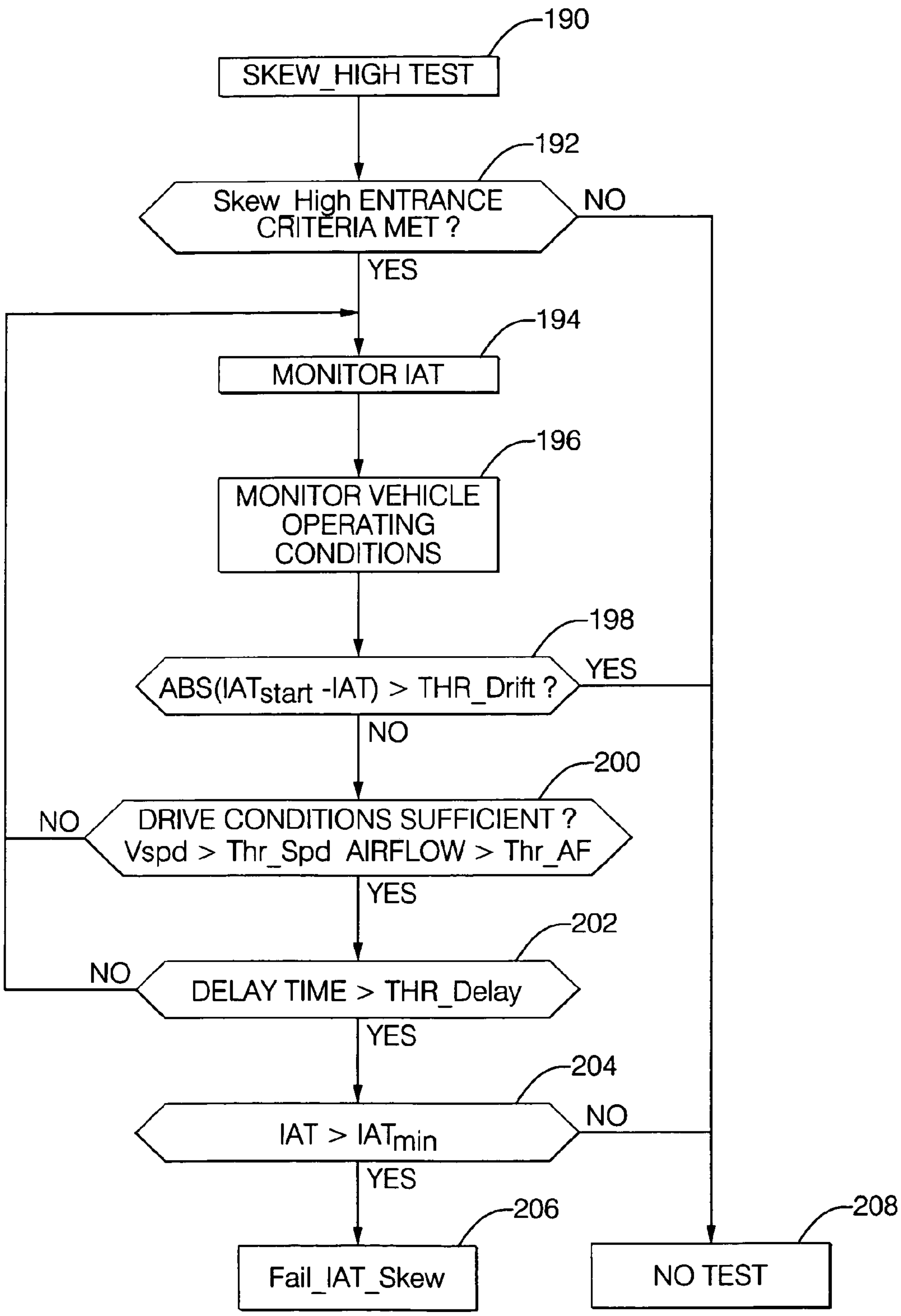

Referring now to FIG. 4 through FIG. 6, flowcharts representing the IAT skewed signal test, comprising an IAT_Skewed_Signal algorithm, is shown. The IAT_Skewed_Signal algorithm comprises measuring input from the intake air temperature sensing circuit 50 and the coolant temperature sensing circuit at engine startup, and determining whether the IAT signal is skewed relative to engine coolant temperature or alternatively, is representative of the engine coolant temperature, $T_{CLT}$. In operation, immediately upon engine start (block 150) it is determined whether entrance criteria for executing the algorithm are met (block 152). The entrance criteria focus on determining whether a cold engine start condition has been achieved, and comprise a measure of elapsed time since previous engine operation. This is referred to as soak time, and is a calibratable value. In this embodiment, the calibration value for the soak time is set to 480 minutes, or 8 hours, and is preferably the same as used by the IAT_Fixed_Signal algorithm. When the entrance criteria for executing the algorithm are not met (block 152), a No_Test condition is determined (Block 162), and the IAT_Skewed_Signal algorithm is discontinued for the trip. No results are communicated to the controller when the No_Test condition occurs. When the entrance criteria for executing the algorithm are met (block 152), the IAT_Skewed_Signal algorithm continues, and intake air temperature at engine start, $IAT_{start}$ and engine coolant temperature at engine start, $CLT_{start}$, are measured and captured by the controller (Block 154).

The intake air temperature at engine start, $IAT_{start}$, is compared to the engine coolant temperature at engine start, $CLT_{start}$ (block 156, 158). When engine coolant temperature at engine start, $CLT_{start}$ exceeds the intake air temperature at engine start, $IAT_{start}$ by more than a predetermined threshold, THR_Skew_Low, (see block 156) a Skew_Low test is performed (block 170). When the intake air temperature at engine start, $IAT_{start}$ exceeds engine coolant temperature at engine start, $CLT_{start}$ by more than a predetermined threshold, THR_Skew_High, (see Block 158) a Skew_High test is performed (block 190). When difference between engine coolant temperature at engine start, $CLT_{start}$ and the intake air temperature at engine start, $IAT_{start}$ does not exceed the THR_Skew_High threshold or the THR_Skew_Low threshold, it is determined that the intake air temperature circuit is functioning properly with respect to the IAT_Skewed_Signal algorithm, and a PASS_IAT_Skewed result is communicated to the engine controller (Block 160). No further diagnostic algorithms are executed this trip event for the IAT_Skewed_Signal algorithm. A typical value for threshold THR_Skew_High (referred to in Block 158) is a difference of 20° C. (36° F.). A typical value for threshold THR_Skew_Low (referred to in Block 156) is a difference of 30° C. (54° F.).

Referring now to FIG. 5, the Skew_Low test (block 170) is described. The Skew_Low Test comprises measuring the intake air temperature during operation of the engine after engine start, and determining whether the measured skewed low IAT is a valid measurement or a result of ambient conditions or vehicle operating conditions. In operation, it is determined whether entrance criteria for executing the algorithm are met (block 172). The entrance criteria focus on determining whether engine coolant temperature is above a minimum value, typically −20° C. (−4° F.). When the entrance criteria for executing the algorithm are not met (block 172), a No_Test condition is determined (Block 186), and the Skewed_Low test is discontinued for the trip. When the entrance criteria for executing the Skewed_Low test are met (block 172), the Skewed_Low test continues. The initial or startup intake air temperature $IAT_{start}$ has previously been captured (block 154), and IAT and vehicle operating conditions of vehicle speed $V_{spd}$ and Airflow are measured by the controller on a periodic basis (blocks 174, 176).

The Skewed_Low test operates by monitoring drift of intake air temperature (block 178), and whether minimum vehicle operating conditions are achieved (block 180) for a minimum amount of time (block 182). Drift of intake air temperature is monitored by periodically comparing measured IAT with the initial or startup intake air temperature $IAT_{start}$ (block 178), and determining whether an absolute difference between the values exceeds a threshold, THR_drift. When the absolute difference between the values exceeds the threshold, THR_drift, at any time during execution of the algorithm a No_Test condition is reported and the Skewed_Low test ends. So long as the absolute difference between the values does not exceed the threshold, THR_drift, vehicle operating conditions are measured. The operating conditions of interest include vehicle speed $V_{spd}$ and Airflow, measured by the controller on a periodic basis, using the aforementioned sensors. When vehicle speed $V_{spd}$ exceeds a threshold speed Thr_Spd (typically 40 kilometers per hour), and Airflow exceeds a threshold airflow Thr_AF (typically 15 grams/second), a delay timer begins to accrue elapsed time. When the vehicle speed $V_{spd}$ exceeds the threshold speed, Thr_Spd and Airflow exceeds the threshold airflow, Thr_AF for an elapsed time greater than a calibrated delay time, THR_delay (typically 60 seconds), and the absolute difference between the measured IAT and initial or startup intake air temperature $IAT_{start}$ does not exceed the drift threshold, THR_drift, it is determined that the intake air temperature circuit not is functioning properly with respect to the IAT_Skewed_Signal algorithm, and a Fail_IAT_Skewed result is communicated to the engine controller (Block 184). When the FAIL_IAT_Skewed result is communicated to the engine controller, the controller acts to set a flag for DTC P0111. When the FAIL_IAT_Skewed result occurs in two consecutive trips, a malfunction indicator lamp is set on the vehicle, and diagnostic trouble code DTC P0111 is the indicated failure when a skilled technician interrogates the engine controller. The process of storing diagnostic trouble codes and subsequent interrogation and retrieval is known to one skilled in the art.

When vehicle speed $V_{spd}$ fails to exceed threshold speed, Thr_Spd or Airflow fails to exceed the threshold airflow, Thr_AF for the elapsed time, THR_delay, the delay timer is discontinued, and elapsed time is set to zero. When vehicle speed $V_{spd}$ again exceeds threshold speed, Thr_Spd and Airflow exceeds the threshold airflow, Thr_AF the elapsed time, the delay timer begins to accrue elapsed time again. This process typically continues until the engine is shutoff, until the IAT drifts beyond the threshold (block 178), or until all conditions are met (blocks 178, 180, 182) and the FAIL_IAT_Skewed result is communicated to the engine controller (block 184).

Referring now to FIG. 6, the Skew_High test (block 190) is described. The Skew_High test comprises measuring the intake air temperature during operation of the engine after engine start, and determining whether the measured skewed high IAT is a valid measurement or a result of ambient conditions or vehicle operating conditions. In operation, the initial or startup intake air temperature $IAT_{start}$ has previously been captured (block 154), and IAT and vehicle operating conditions of vehicle speed $V_{spd}$ and Airflow are measured by the controller on a periodic basis (blocks 194, 196), using the aforementioned sensors.

The Skewed_High test operates by monitoring drift of intake air temperature (block 198), and whether minimum vehicle operating conditions are achieved (block 200) for a minimum amount of time (block 202). Drift of intake air temperature is monitored by periodically comparing the measured IAT with the initial or startup intake air temperature $IAT_{start}$ (block 198), and determining whether an absolute difference between the values exceeds a predetermined threshold, THR_drift. When the absolute difference between the values exceeds the threshold, THR_drift, at any time during execution of the algorithm, a No Test condition is reported and the Skewed_High test ends. So long as the absolute difference between the values does not exceed the threshold, THR_drift, vehicle operating conditions are measured. The operating conditions of interest include vehicle speed $V_{spd}$ and Airflow, which are measured by the controller on a periodic basis, using the aforementioned sensors. When vehicle speed $V_{spd}$ exceeds a threshold speed Thr_Spd (typically 40 kilometers per hour), and Airflow exceeds a threshold airflow Thr_AF (typically 15 grams/second), a delay timer begins to accrue elapsed time. When the vehicle speed $V_{spd}$ exceeds the threshold speed, Thr_Spd and Airflow exceeds the threshold airflow, Thr_AF for an elapsed time greater than calibrated delay time, THR_delay (typically 60 seconds), the absolute difference between the measured IAT and initial or startup intake air temperature $IAT_{start}$ does not exceed the drift threshold, THR_drift, and the measured IAT exceeds a threshold value for intake air temperature, $IAT_{max\_thresh}$ (block 204), it is determined that the intake air temperature circuit is not functioning properly with respect to the IAT_Skewed_Signal algorithm, and a Fail_IAT_Skewed result is communicated to the engine controller (Block 206). When IAT does not exceed $IAT_{max\_thresh}$ a No_Test condition is reported, and the Skewed_High test ends. When the FAIL_IAT_Skewed result is communicated to the engine controller, the controller acts to set a flag for DTC P0111. When the FAIL_IAT_Skewed result occurs in two consecutive trips, a malfunction indicator lamp is set on the vehicle, and diagnostic trouble code DTC P0111 is the indicated failure when a skilled technician interrogates the engine controller. The process of storing diagnostic trouble codes and subsequent interrogation and retrieval is known to one skilled in the art.

When vehicle speed $V_{spd}$ fails to exceed threshold speed, Thr_Spd or Airflow fails to exceed the threshold airflow, Thr_AF for the elapsed calibration time, THR_delay, the delay timer is discontinued, and elapsed time is set to zero. When vehicle speed $V_{spd}$ again exceeds threshold speed Thr_Spd and Airflow exceeds the threshold airflow Thr_AF, the delay timer begins to accrue elapsed time. This process typically continues until the engine is shutoff, until the IAT drifts beyond the threshold (block 178), or until all conditions are met (blocks 198, 200, 202, 204) and the FAIL_IAT_Skewed result is communicated to the engine controller (block 206).

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. An electronic controller operable to monitor an intake air temperature sensing circuit for an internal combustion engine, comprising:

the electronic controller signally connected to the intake air temperature sensing circuit, and, signally connected to a coolant temperature sensing circuit;

the electronic controller signally connected to a plurality of engine sensors, each of the plurality of engine sensors operable to measure at least one engine operating condition;

wherein the electronic controller is operable to:

determine the measured intake air temperature changes in response to a change in actual intake air temperature, based upon the at least one engine operating condition and the measured intake air temperature; and, determine the measured intake air temperature is representative of actual intake air temperature, based upon the measured intake air temperature, the coolant temperature, and the at least one engine operating condition.

2. The controller of claim 1, wherein the controller is operable to determine the measured intake air temperature is accurate when the controller determines: the change in the measured intake air temperature is a response to the change in actual intake air temperature, based upon the at least one engine operating condition and the measured intake air temperature.

3. The controller of claim 2, further comprising the controller operable to determine that measured intake air temperature is accurate when the controller determines: the measured intake air temperature is representative of actual intake air temperature, based upon the measured intake air temperature, the coolant temperature, and the at least one engine operating condition.

4. The controller of claim 1, wherein the controller is operable to determine that measured intake air temperature is accurate only when the controller determines:

the change in the measured intake air temperature is a response to the change in actual intake air temperature, based upon the at least one engine operating condition and the measured intake air temperature; and, the measured intake air temperature is representative of actual intake air temperature based upon the measured intake air temperature, the coolant temperature, and the at least one engine operating condition.

5. A method to monitor an intake air temperature sensing circuit for an internal combustion engine, comprising:

measuring intake air temperature with the intake air temperature sensing circuit;

measuring coolant temperature;

measuring at least one engine operating condition;

determining the measured intake air temperature changes in response to a change in actual intake air temperature, based upon the at least one engine operating condition and the measured intake air temperature; and, determining the measured intake air temperature is representative of actual intake air temperature, based upon the measured intake air temperature, the coolant temperature, and the at least one engine operating condition.

6. The method of claim 5, wherein determining the measured intake air temperature is accurate when: the change in the measured intake air temperature is a response to the change in actual intake air temperature, based upon the at least one engine operating condition and the measured intake air temperature.

7. The method of claim 6 further comprising determining the measured intake air temperature is accurate when the measured intake air temperature is representative of actual intake air temperature based upon the measured intake air temperature, the coolant temperature, and the at least one engine operating condition.

8. The method of claim 5 further comprising determining measured intake air temperature is accurate only when:

the change in the measured intake air temperature is a response to the change in actual intake air temperature, based upon the at least one engine operating condition and the measured intake air temperature; and, the measured intake air temperature is representative of actual intake air temperature based upon the measured intake air temperature, the coolant temperature, and the at least one engine operating condition.

* * * * *